April 17, 1962    M. R. COMMANDAY ETAL    3,030,491
METAL COATING AND BRAZING PROCESS
Filed June 15, 1959
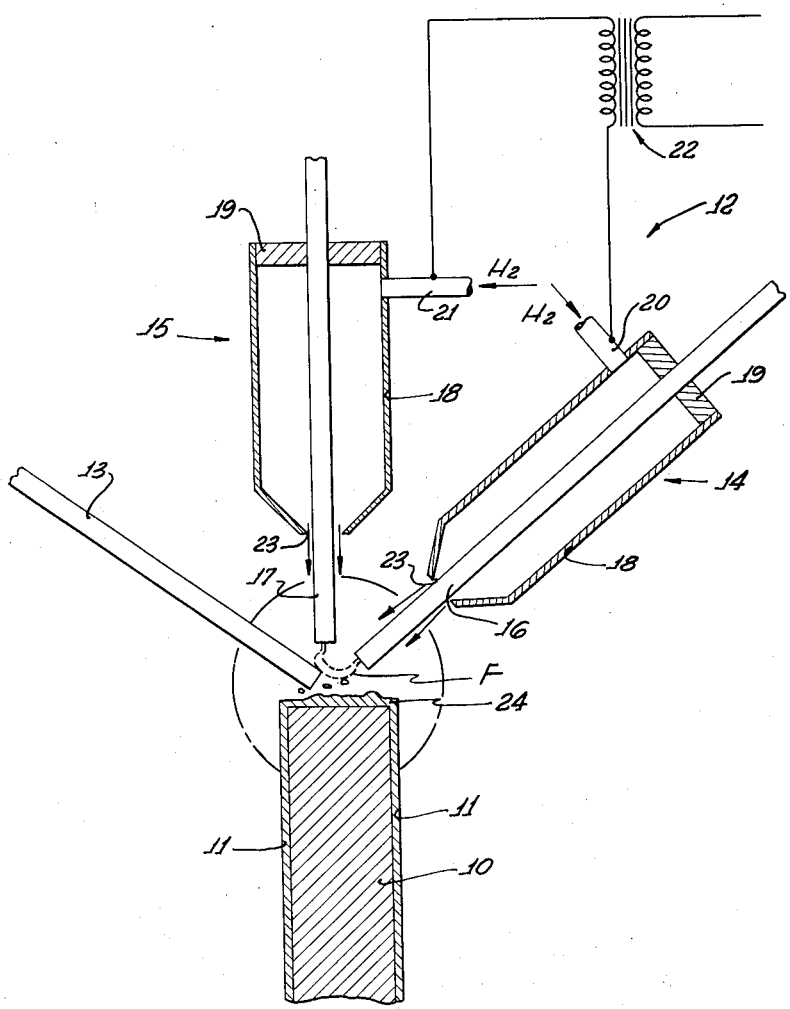
MAURICE R. COMMANDAY
JAMES R. DARNELL
INVENTORS.
ATTORNEYS

United States Patent Office 3,030,491
Patented Apr. 17, 1962

3,030,491
METAL COATING AND BRAZING PROCESS
Maurice R. Commanday, Los Angeles, and James R. Darnell, Reseda, Calif., assignors, by mesne assignments, to Chromizing Corporation, a corporation of Delaware
Filed June 15, 1959, Ser. No. 820,184
9 Claims. (Cl. 219—76)

This invention relates generally to the application of refractory, oxidation resistant coatings or deposits on refractory metals of the group consisting of molybdenum, tungsten, columbium, tantalum and their alloys, the latter being characterizable as any of these base metals alloyed with lesser percentages of such metals as another metal of the group, or metals such as iron, nickel, chromium, etc., were the alloy possesses refractory properties similar to those of the base metal. More particularly, the invention is directed to new methods for the application of refractor or oxidation resistant coatings or deposits to localized areas of such base metals as their alloys, or to interruptions in refractory coatings previously applied thereto.

Use of the above-mentioned refractory metals (hereinafter referred to as including their alloys) at high temperatures in air or other oxidizing environments requires that the metals be coated to prevent their rapid oxidation at high temperatures at which their strengths have economic advantage. The most successful coatings in current use are those composed of silicides of the refractory metals, which can be applied by known processes involving the so-called vapor plating or solid granular pack techniques, the general effect of which is to form a silicide, or disilicide on the surface of the face refractory metal so treated.

The nature of the refractory metal oxidation is such that to be successful a protective coating must be applied in a continuous layer to the surface or surfaces of the metal exposed to high temperature oxidation. Interruption or absence of the coating in even a small area, such as might be exposed by cutting or accidental damage, would result in violent oxidation at the exposed area and consequent rapid failure of the base metal. For this reason, any slight damage to the coating, either through intentional cutting or grinding, or accidentally, resulting in exposure of the base metal has ordinarily necessitated recoating the entire structure or part, an expensive and often impractical procedure. In addition, the joining of coating refractory metal or metal parts has previously been limited to the use of coated screw fastener or like joints which are more expensive and less efficient than welded, brazed or riveted joints.

The present invention has among its general objects to provide a new process whereby it is now made possible to coat areas of the base metal with such selectivity as may be required, as for the repairing of damaged or interrupted coatings, and for replacing coatings in weldment areas where welded joints have been made between coated parts. Also contemplated is the formation of brazed joints between coated refractory metals where the deposited brazed material has essentially the same desirable oxidation resistance characteristics as the metal coatings.

More specifically, the invention has for its object to provide a novel process for the deposition of molybdenum silicide or molybdenum disilicide by fusion onto uncoated or silicide coated refractory metals in a high temperature hydrogen atmosphere. Insofar as we are aware, it has been generally assumed that molybdenum silicide or disilicide cannot be deposited by fusion, for various reasons including the instability of the silicide at fusion temperatures. We have discovered that under the particular conditions contemplated by the invention, and characterized by fusion of the silicide in an atmosphere of hydrogen at a temperature in the range of from 5,000 to 6,000° F., the silicide may be fused and deposited in a stable, strongly bonded and continuous coating which effectively protects any base metal area to which the coating is applied, and can restore the continuity of an interrupted, silicide coating applied by known techniques.

In accordance with the invention, we may create for the silicide fusion and high temperature stability maintenance, an atomic hydrogen welding arc atmosphere by passing hydrogen as in the manner later explained, to the locus of an electric arc maintained between tungsten electrodes. The hydrogen molecules are dissociated by the arc energy to produce hydrogen atoms, which recombine to the molecular state in a zone proximate to the arc, so that the energy of recombination produces a "flame" of intense heat which may range upwardly of 6,000° F. The hydrogen also produces about a molybdenum silicide compostion fed to or maintained in the vicinity of the arc, a reducing atmosphere that reduces oxides and thereby prevents oxide formation of non-porous deposition of the silicide. We have found that either the coated or uncoated base refractory metal, i.e. molybdenum, tungsten, columbium or tantalum can be heated locally with an atomic hydrogen flame, and solid molybdenum disilicide either in powdered, pressed or sintered form can be intoduced into the flame region so as to fuse and bond to the coated or uncoated surface of the base metal.

In further reference to base refractory metals having interrupted previously applied silicide coatings, we may cite as typical, base metals coated by formation and diffusion of the silicides of the metals onto their surfaces by a generally known type of process involving exposure of the metal in a pack of granular solids to silicon halide in a reducing atmosphere in high temperatures over proper periods of time. As is known, the solid halide reacts with the surface of the refractory metal to produce a non-porous adherent layer of intermetallic compounds such as the silicide and disilicide of the base metal, and perhaps containing an outer concentration of elemental silicon. Such solid pack processes involve heating the metal in contact with a granular or pulverluent composition comprising a silicon-bearing material such as powdered silicon or ferro silicon which may comprise between about 3 to 95 weight percent of the granular mixture, a powdered inert diluent such as tabular alumina, clay, bauxite, bentonite, crushed fire clay and the like, and a so-called energizer in a minor quantity usually below 5 percent of the pack components, in the form of an inorganic halide, i.e. bromide, iodide, fluoride or chloride of ammonium or a metal such as iron or copper. The pack may be contained in an impermeable box or retort of appropriate heat resistant metal, the box having a fusible rim seal that melts during the heating cycle to allow excess gases to vent, and which solidifies upon cooling to prevent air from entering the box. Generally the silicide coating formation involves heating the pack to a temperature that may range typically from 1600° F. to 2200° F. over a period of about 4 to 12 hours.

The present process, and with particular reference to the hydrogen arc creation and disilicide fusion, will be understood more fully from the following description of the accompanying drawing in which we have shown diagrammatically an illustrative means for creating the arc in proximate relation to the metal surface to be coated.

Referring to the drawing, the base metal 10, which may be any of the named refractory metals, may be regarded preferably as being composed of molybdenum or a molybdenum alloy, to which has previously been applied, as in accordance with the solid pack technique referred to in the foregoing, molybdenum disilicide surface coatings 11 which are continuous and fully protective of the base metal up to the end face of the piece which initially we assume to be uncoated and to require a protective coating similar to and in continuity with the coatings 11.

The hydrogen arc generating equipment generally indicated at 12 and to be used for fusion of sintered or compacted molybdenum disilicide or modified molybdenum disilicide 13, is shown to comprise units 14 and 15 containing tungsten electrodes 16 and 17 extending and advanceable axially within chambers 18 through appropriate gas seals 19 in the heads thereof. The chambers are made of conductive metal such as copper, as are also the connecting tubes 20 and 21 through which hydrogen is fed. The hydrogen leaves the chambers through annular clearances at 23, so that the released hydrogen streams flow along and about the arcing terminals of the electrodes. Chambers 18 and their supply tubes 20, 21 are connected to the terminals of a high current transformer 22 having an output at the voltages employed in hydrogen arc welding.

As previously indicated, the arc produced at the convergent terminals of the electrodes causes dissociation of the hydrogen streams fed thereto, followed by recombination of the hydrogen atoms, all within a high temperature zone generally indicated by the broken circular line outside the flame front at F, which envelops the exposed end of the metal piece 10 and the tip of the molybdenum disilicide rod 13. The melting temperature of the workpiece 10 (usually being in excess of 3400° F.) being greater than that of the molybdenum disilicide, the tip of the rod 13 will fuse onto the workpiece end to deposit a coating 24 of the disilicide in continuity with the coatings 11.

To cite a specific example, a piece of molybdenum alloyed with 0.5% titanium was given a molybdenum silicide coating at 11 by the previously described pack method, to a thickness of approximately 0.0015 inch, and the ends were cut off by means of an abrasive wheel to expose the base metal. The cut ends were then covered by fusing molybdenum disilicide onto the surfaces in the manner described and depicted by the drawing, allowing the silicide to overlap the side coatings. The specimen was then allowed to cool in air and subsequently was tested in still air within an electric furnace for two hours at approximately 1700° F. No oxidation or other attack was observed on or adjacent to the repaired areas.

While the composition to be fused, e.g. the rod 13, may consist of molybdenum disilicide, it may be desirable to depress its melting point by the addition of appropriate lower melting metals or metallic compounds. Thus if desired, the disilicide may be mixed, compacted or sintered uniformly with a melting point depressant such as iron, chromium, aluminum, silicon, or silica.

We claim:
1. The process of coating a refractory metal of the group consisting of molybdenum, tungsten, columbium, tantalum and alloys thereof, that includes fusing molybdenum disilicide from solid state onto said surface within the reducing atmosphere of hydrogen being heated by an electric arc.

2. The process of coating a refractory metal of the group consisting of molybdenum, tungsten, columbium, tantalum and alloys thereof that includes fusing molybdenum disilicide from solid state onto said surface within an atmosphere of hydrogen being maintained at a temperature between about 5000° F. and 6000° F.

3. The process of coating a refractory metal of the group consisting of molybdenum, tungsten, columbium, tantalum and alloys thereof that includes fusing molybdenum disilicide from solid state onto said surface within a high temperature reducing atmosphere produced by feeding hydrogen to an electric arc, said atmosphere enveloping the surface and disilicide undergoing fusion onto the metal surface.

4. The process of claim 3, in which said metal being coated is predominately molybdenum.

5. The process of coating an exposed area of the surface of a metal of the group consisting of molybdenum, tungsten, columbium, tantalum, and their alloys, when said area is adjacent an existing disilicide-coated surface of the metal, that includes fusing molybdenum disilicide from solid state onto said exposed area within a high temperature reducing atmosphere produced by feeding hydrogen to an electric arc so that the reducing atmosphere envelops said area and the molybdenum disilicide, and the disilicide is fused continuously over said area and into continuity with said adjacent disilicite-coated surface of the metal.

6. The process of claim 5, in which the disilicide-coated metal is predominately molybdenum.

7. The process of claim 6, in which said existing coating is essentially molybdenum disilicide.

8. The process of claim 5, in which said molybdenum disilicide before fusion is in discrete particle form.

9. The process of claim 5, in which said molybdenum disilicide is composed of particles integrated into a body.

References Cited in the file of this patent

UNITED STATES PATENTS 2,299,483    Friedrick et al. _____ Oct. 20, 1942

OTHER REFERENCES

Miller: "Molybdenum Production, Properties and Applications," Metal Industry, November 18, 1949, pages 439–441.